Figure 1:
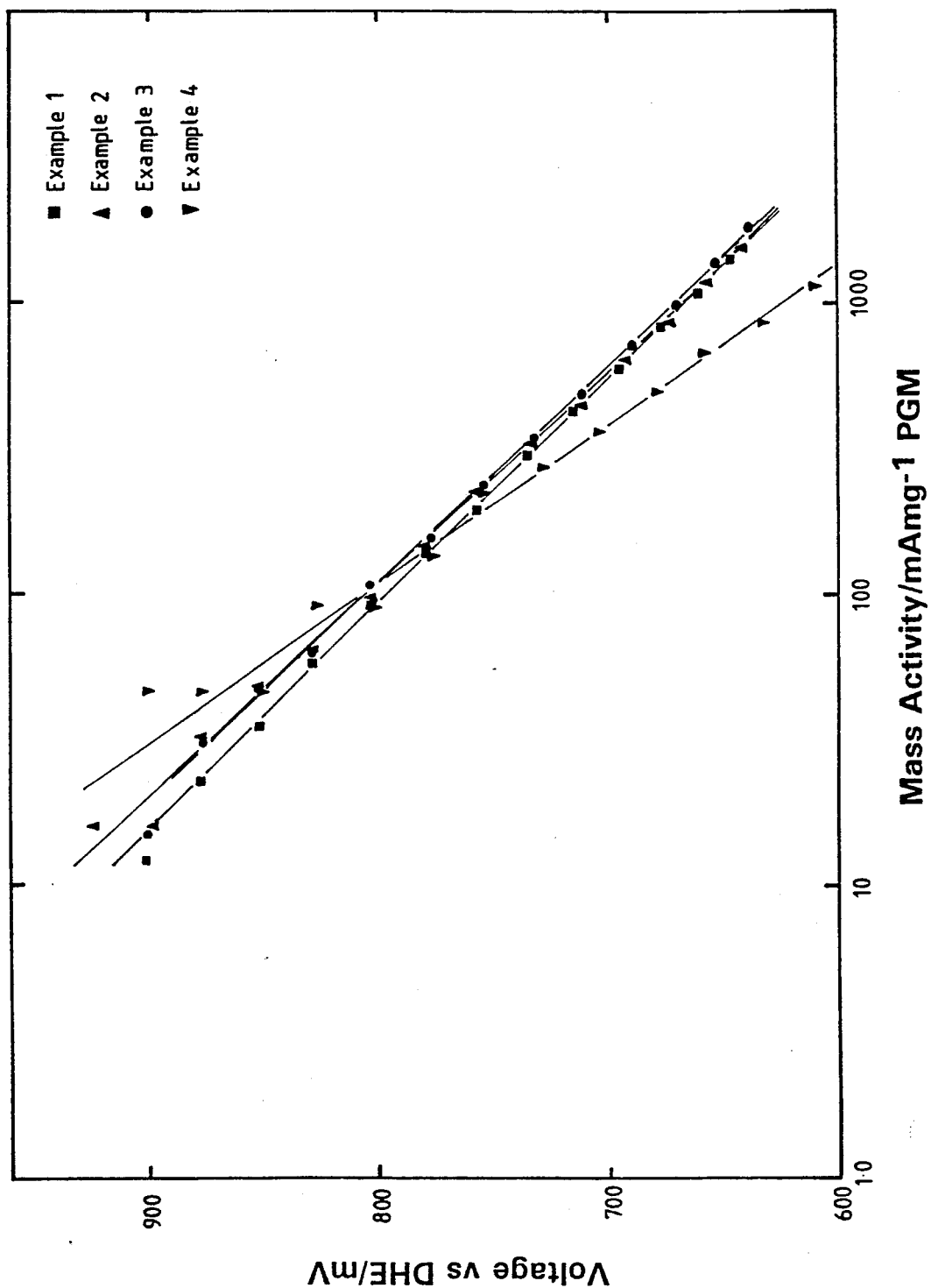

United States Patent [19]

Cooper et al.

[11] Patent Number: 5,316,990
[45] Date of Patent: May 31, 1994

[54] CATALYST MATERIAL

[75] Inventors: Susan J. Cooper, Reading; Graham A. Hards, Wallingford; David Thompsett, Reading, all of United Kingdom

[73] Assignee: Johnson Matthey Public Limited Company, London, England

[21] Appl. No.: 872,301

[22] Filed: Apr. 23, 1992

[30] Foreign Application Priority Data

May 4, 1991 [GB] United Kingdom ............... 9109751

[51] Int. Cl.$^5$ ............................................... B01J 37/34
[52] U.S. Cl. ...................................... 502/5; 502/163; 502/167
[58] Field of Search ........................... 502/5, 163, 167

[56] References Cited

U.S. PATENT DOCUMENTS

| | | | |
|---|---|---|---|
| 3,617,388 | 11/1971 | Matsuda et al. | 429/40 |
| 4,035,260 | 7/1977 | Schmitt, Jr. et al. | 502/185 |
| 4,179,350 | 12/1979 | Deborski | 204/284 |
| 4,325,793 | 4/1982 | Kisch | 204/157.1 R |

FOREIGN PATENT DOCUMENTS

| | | | |
|---|---|---|---|
| 8003387 | 1/1982 | Netherlands . | |
| 1470034 | 4/1977 | United Kingdom | C22B 11/02 |
| 2164785 | 3/1986 | United Kingdom . | |

OTHER PUBLICATIONS

W. Freyer, M. Lequoc, Derwent Abstract, DD 000226288 A (Akad Wissenschaft).

TDK Electronics KK, Derwent Abstract, JP 088025493 B.

Yoshida, Kazumasa; Watabe, Michio—Derwent Abstract, JP 058032368 A (Toshiba Battery).

J. A. Rob Van Veen, J. F. Van Baar, K. J. Kroese, "Effect of Heat Treatment on the Performance of Carbon-supported Transition-metal Chelates in the Electrochemical". . . J. Chem. Soc., 1981, 77, pp. 2827-2843.

J. A. R. van Veen et al., "Oxygen Reduction on Transition-Metal Porphyrins in Acid Electrolyte", Ber. Bunsenges. Phys. Chem. 85, pp. 693-700 (1981).

J. A. R. van Veen, C. Visser, "Oxygen Reduction on Monomeric Transition Metal Phthalocyanines in Acid Electrolyte" Electrochim. Acta., vol. 24, pp. 921-928.

W. Aldred, C. Fierro, S. Gupta, B. Simic-Glavaski, E. Yeager, "Transition Metal Macrocycles and Related Complexes as Catalysts for Oxygen Electrodes" Final Report, Oct. 1984, pp. 1-117.

K. Wiesener, D. Ohms, V. Neumann, R. Franke, "N4 Macrocycles as Electrocatalysts for the Cathodic Reduction of Oxygen" Materials Chemistry and Physics, 22 (1989) pp. 457-475.

*Primary Examiner*—Patrick P. Garvin
*Assistant Examiner*—Brent M. Peebles
*Attorney, Agent, or Firm*—Cushman, Darby & Cushman

[57] ABSTRACT

An improved catalyst material is derived from a precious metal-containing macrocyclic compound precursor, which contains precious metal in zero oxidation state. The material may be produced by activating the compound, for example by a voltage sweep. The material offers useful improvements in activity and resistance to de-activation, when used as a fuel cell catalyst.

13 Claims, 6 Drawing Sheets

CATALYST MATERIAL

This invention relates to an improved catalyst material, and in particular to a catalyst material of particular interest for fuel cells and batteries.

In a fuel cell, a fuel, which may be hydrogen, a hydrocarbon or an oxygen-containing fuel such as methanol, is oxidised at a fuel electrode (anode), and oxygen is reduced at a cathode. An electrolyte, which may be alkaline or acidic, and in liquid or solid state, contacts the electrodes, which may be coated with an electrocatalyst. There have been many proposals for such fuel cell electrocatalysts.

A phosphoric acid fuel cell (PAFC) operates with an electrolyte of concentrated phosphoric acid, typically at temperatures of between 180° C. and 220° C. Any material used for the cathode or anode must be stable with respect to the temperature at which the fuel cell operates and maintain reasonable activity in the presence of the phosphoric acid.

A proton exchange membrane fuel cell (PEMFC) is another type of acidic electrolyte fuel cell, in which the electrolyte is a solid proton-conducting polymer. The PEMFC is typically operated at around 80° C. to 100° C.

The PAFC is the type of fuel cell closest to commercialisation and there are a number of demonstration units, especially in Japan, where there are considerable economic and environmental pressures to reduce imports of hydrocarbon fuels and to cut polluting emissions from power generation. It is envisaged that the PAFC will find applications in the multi-megawatt utility power generation market and also as combined heat and power, i.e. co-generation, systems, in the 50 to several hundred kW range. The PEMFC can provide much higher power density output than the PAFC, and can operate efficiently at much lower temperatures. Because of this, demonstration units of this type of fuel cell are being built for evaluation in various applications. This is of particular interest in the United States, where continuing concern over polluting emissions from motor vehicles may restrict the use of combustion engines in the future.

Many people consider that these fuel cells are, however, unlikely to get beyond the demonstration stage because power output is too low for the capital costs involved. In both the PAFC and the PEMFC, power output is limited in part by the activity and durability of the cathode catalyst. Increasing cathode catalyst activity and stability can result in higher, sustainable, power density at the same efficiency. The capital cost per unit of power is therefore reduced in proportion to the increase in performance. Because the cost of the cathode catalyst is a small fraction of the cost of the fuel cell stack, increasing the power density of the stack reduces the capital cost per unit power out of all proportion to the value of the catalyst per se. It is therefore widely recognised that a cathode catalyst with improved performance would have great value in reducing overall capital cost per unit power.

In addition to the need for improved catalyst activity, it is also vitally important that the electrodes containing these catalysts should maintain this high activity throughout the lifetime of the fuel cell, with ideally, no performance decay.

It has become accepted in the fuel cell catalyst art that a "standard" catalyst formulation for electrodes for fuel cells with acidic electrolytes, e.g. the PAFC and the PEMFC, comprises platinum, by itself or as an alloy, either as a high surface area black, i.e. metal powder, or supported on a high surface area conducting carbon substrate material. The most active catalysts are supported on high surface area conducting carbons, and are made by techniques involving complex platinum solution chemistry, many of which remain as proprietary processes. Mention can be made of the method disclosed by H. Petrow and R. Allen (U.S. Pat. No. 3,992,512), in which very small colloidal particles of platinum are adsorbed from solution onto the carbon support. Very small crystallites of platinum, ranging from 15–30 Å, are formed in the carbon, and these provide a catalyst with very high activity. Alloy catalysts of Pt, typically with metals from Group III to Group VIII of the Transition Metal series, are most commonly formed by adsorption of the base metal onto a preformed platinum on carbon catalyst, followed by heat at temperatures above 700° C. to effect formation of the alloy. These materials possess higher activity than pure platinum catalysts and are the most active catalysts developed for use in acid electrolyte fuel cells such as the PAFC. Such alloy materials are disclosed in U.S. Pat. No. 4,447,506.

It is appropriate here to define the term activity. Activity is defined as the maximum current obtained from the catalyst, when fabricated into an electrode, at a given voltage (i.e., efficiency) divided by the weight of active catalyst in the electrode. It is therefore also known as the "mass activity". When comparing different catalysts, an increase in activity is thus related to the current density increase for the same active catalyst metal content. There is good agreement in the prior art that when evaluated as oxygen reduction cathodes in 100% phosphoric acid at 180° C. with pure oxygen as the reactant, the most active platinum supported on carbon catalysts have activities ranging from 30–40 mAmg$^{-1}$Pt at 900 mV vs SHE (Standard Hydrogen Electrode) (see for example P. Ross, Precious Metals 1986, International Precious Metals Institute, Allentown, Pa., 1986, p 355-363; L. Keck et al, 1st International Fuel Cell Workshop, Tokyo, Sep. 16th 1989, p 29-39; F. Luczak, D. Landsman, U.S. Pat. No. 4,447,506). On alloying, the activity of the most active Pt alloy catalysts are reported (also in the preceeding references) to be in the range 50–60 mAmg$^{-1}$Pt.

During practical fuel cell operation, the cells are operated at fixed current density output, and it is desirable to maintain as high and as stable a cell voltage as possible to maintain high efficiency and power output. For PAFC's the voltage performance of the cathode containing this platinum catalyst typically declines at a rate of from 1 to 10 mV per 1,000 hours of operation. Part of the reason for this decline is due to sintering, wherein the active catalyst particles tend to coalesce, either by surface migration or dissolution/re-precipitation, causing a reduction in effective surface area and hence in activity. It is also possible that platinum can be permanently lost from the cathode by dissolution into the electrolyte. It has been reported (J. Aragane, J. Electrochemical Society, 135, 844, 1988) that, in an operation of a PAFC for 4,500 hours, 60% of the platinum content of the cathode was lost by dissolution. This loss in platinum electrocatalyst performance is one of the most serious technical problems encountered in fuel cells.

Increasing PAFC temperatures, pressures and potentials accelerates catalyst de-activating processes.

The development of active catalysts having good stability is therefore extremely desirable. Many attempts have been made.

Metal-containing macrocyclic compounds have been investigated for a number of years as fuel cell catalysts. These studies have almost exclusively centred on the use of base metal macrocyclic compounds. A macrocyclic compound is defined as a cyclic compound with nine or more members (including all heteroatoms) and three or more ligating atoms (Coordination chemistry of Macrocyclic Compounds, G. A. Melson, Plenum Press, New York & London, 1979). Amongst the metal macrocyclic compounds are N4-chelate compounds, such as phthalocyanines, porphyrins and tetraazaannulenes.

Although some of these materials have found use as fuel cell cathodes in alkaline electrolytes, such as potassium hydroxide, their performance as regards activity and especially stability, has been unsuitable for use in the more widely employed acid electrolyte fuel cells. In fact there are no instances of this type of material having any practical use in acid electrolyte fuel cells under the operating conditions of temperature and electrolyte concentration that are normally employed.

GB 2,164,785A discloses the use of transition metal phthalocyanine compounds as catalyst materials. The use of platinum phthalocyanine as a cathode with 6M alkaline potassium hydroxide as electrolyte is described. Van Veen et al, (Electrochimica Acta, 24 921-928, 1979), discusses activity for a number of macrocycles of Pt, Pd, Ru, Fe, Co, Mn and Zn with either $H_2SO_4$ or KOH as the electrolyte. Further disclosures by Van Veen et al, (Ber Bunsenges Phys Chem, 85, 693-700, 1981; and J. Chem Soc, Faraday Trans 1, 77, 2827-2843, 1981) include activity measurements for a number of other macrocycles. One of the examples is iridium(III) meso-tetra(para-isopropylphenyl)porphyrin chloride which after heat treatment showed an oxygen reduction activity of 2.2 mAmg$^{-1}$ of catalyst, at 850 mV, with an electrolyte of 4M $H_2SO_4$, at 23° C. NL 8003387 also discloses a carbon supported iridium(III) meso-tetra-(para-isopropylphenyl)porphyrin chloride electrocatalytic material in which the activity for oxygen reduction is quoted as 2.0 mAmg$^{-1}$ catalyst at 850 mV and after running at 1.0 mAcm$^{-2}$ for 16 hours a loss of 10 mV occurred.

Yeager et al, (DOE Report October 1984 LBL-18542) have disclosed a $\mu$-oxo-di(iron(III)meso-tetra(-para-methoxyphenyl)porphyrin) catalyst material supported on a high surface area activated carbon, for use as a cathode with phosphoric acid as electrolyte. On evaluation with oxygen as the reductant, in 85% phosphoric acid, at 100° C., the activity at 900 mV reached a maximum of 5.0 mAmg$^{-1}$ of iron. After operation of a cathode comprising this catalyst, at a temperature of only 100° C., at a current density of 100 mAcm$^{-2}$ for 7.5 hours, a performance decay of 60 mV was reported. Although this performance is amongst the highest reported for a macrocyclic material in an acid electrolyte, the decay rate is still far too great to be of any use. Furthermore, it has been reported that this material was unstable at temperatures greater than 100° C., and as such would again have no application in a practical phosphoric acid fuel cell operating at a temperature above 180° C.

In all this prior art the actual catalysts are the macrocyclic compounds themselves, which can be characterised by the central metal atom species being in an oxidised form; i.e. a valence state greater than zero. Inert atmosphere heat treatments have been used on prior art materials in attempts to improve catalyst activity and durability. Such treatment has the apparent effect of partially degrading the macrocycle and forming a closer interaction between catalyst and support. While this does result in a more durable and (sometimes) a more active catalyst, even these catalysts do not show good activity and stability under phosphoric acid fuel cell conditions (Yeager, ref above). The materials are not subjected to an activation procedure to modify the chemical state of the metal. This is discussed by K. Wiesener et al (Mater Chem Phys, 22, 457, 1989).

We have invented a novel catalyst material which demonstrates higher activity for catalysing fuel cell reactions than all prior art materials, and also shows enhanced stability in acidic electrolytes compared to all prior art materials.

The novel catalyst material, supported on high surface area carbons, may be derived from precursors of precious metal-containing macrocyclic compounds. Said precursors undergo an activation process, which modifies the chemical state of the catalytic metal, to produce the precious metal catalyst material.

Accordingly, the present invention provides a catalyst material derived from precious metal-containing macrocylic compound precursors and supported on high surface area carbons, which catalyst material contains precious metal in zero oxidation state.

Preferably the precursor material undergoes an activation process to give the catalyst material containing precious metal in the zero oxidation state.

The invention also provides a fuel cell, having at least one electrode coated with the electrocatalytic material of the invention.

The invention further provides an electrode, coated with the catalytic material of the invention.

Suitable precious metals are the platinum group metals, Pt, Pd, Ru, Os, Rh, Ir, and gold and silver. Preferably the precious metal is platinum or iridium. The macrocycle may be an N4-chelate compound and is preferably a phthalocyanine, a porphyrin or a tetraazaanulene. Most preferably, the macrocycle is a phthalocyanine or tetraazaannulene.

Suitable carbon supports are of the type commercially available. They may be prepared specifically for this application. Preferred carbons are the highly conductive oil furnace blacks and acetylene blacks. The carbon supports may be predominantly amorphous or graphitic. They may be prepared commercially, or specifically treated to increase their graphitic nature. Particularly preferred are graphitised carbons. The Brunauer, Emmett and Teller (BET) surface area of the carbon support material may be between 0 and 2000 m$^2$g$^{-1}$, e.g. between 30 and 400 m$^2$g$^{-1}$.

The loading of the precious metal macrocycle compound may be between 0.1 and 70 wt % of the carbon support and is preferably between 0.1 and 30 wt %.

The loading of the precious metal may be between 0.05 and 20 wt % of the carbon support and is preferably between 0.1 and 10 wt %.

The invention further provides a method of preparing the carbon supported precursor to the catalytic material comprising dissolving a precious metal macrocyclic compound in aqueous or organic solvent to form a solution, adding carbon to the solution, adsorbing the macrocyclic material onto the carbon support, and separating the carbon supported macrocyclic material.

Preferably, agitation is employed to aid the adsorption of the macrocylic material. It is preferably maintained for between 1 and 16 hours. In a method of the invention, it is preferred to dissolve the precious metal macrocyclic compound in sulphuric acid of between 13 and 16 molar concentration to form the solution.

The carbon supported macrocyclic precursor may be prepared by the method according to the invention or by any known method.

The invention further provides a means of activating the precursor materials to produce the catalytic material of the invention, and in which the oxidation state of the metal atom species is changed, comprising the application of a potential to an electrode carrying the carbon supported macrocylic catalyst precursor, which is immersed in an acid electrolyte, and repeatedly cycling this potential between defined limits for a defined number of cycles.

An electrode bearing the macrocyclic precursor material can be prepared in the conventional manner. This generally involves dispersing the material in a suspension of a hydrophobic material, such as polytetrafluoroethylene (PTFE), coating a substrate such as PTFE wet-proofed graphite paper or carbon cloth with the dispersion and sintering the coated substrate, in either an oxygen-containing atmosphere such as air, or an inert atmosphere such as nitrogen.

In a method of the invention, it is preferred to activate the electrodes, containing the macrocyclic catalysts, to produce the active material by sweeping an applied potential between 0.05 and 2.0 V preferably between 0.5 and 1.2 V versus a dynamic hydrogen electrode (DHE) at least ten times, in phosphoric acid at elevated temperatures. However, other methods to activate the macrocyclic precursor material which do not require the fabrication of electrodes, for example, use of slurry or suspension electrochemical cells, immersion in hot concentrated acids with gas purging, and gas phase heat treatment, or treatment in controlled atmosphere or atmospheres may be used.

The catalytic material may be used in a fuel cell as the cathode for oxygen reduction or as the anode for hydrogen oxidation. If the material is used as the anode in a fuel cell the hydrogen fuel may contain a minor proportion of carbon monoxide, for example up to 5 vol %.

Although the material according to the invention has particular application in PAFC and PEMFC, and is described herein in detail with reference to its use in the former, it is clear to us that the materials have uses in other fuel cells or for other applications, such as in electrodes for batteries, or as catalysts for other chemical processes.

The invention will now be particularly described in the following examples, which are to be regarded as illustrative and not limiting. Each of the exemplary catalysts was made into test electrodes following the methods outlined above.

The terms of "activity", "electrochemical metal area (ECA)", "specific activity", and "durability" refer to these properties measured according to the methods contained in the following paragraphs. "Gas diffusion electrodes" used are prepared by mixing the catalyst with PTFE, applying to a wet-proofed graphite paper and sintering as is usually practiced in the art. In addition, another type of electrode is used in which the amount of PTFE used is sufficiently low to allow the electrode structure to be fully wetted by the electrolyte at 180° C. This is known as a "flooded electrode" and has been described in the literature by H. Kunz and G. Gruver (J. Electrochemical Soc, 122, 1279, 1975) and P. Stonehart and P. Ross (Electrochim Acta, 21, 441, 1976).

Activity is a measure of the oxygen reduction ability per unit weight of the catalyst material present, and is often referred to as mass activity. Measurements of over-voltage at various current densities are made in an electrochemical half cell using 100% phosphoric acid electrolyte at 180° C., with oxygen and air as the reactants at atmospheric pressure. The current flow through the test electrode at a series of IR (Internal Resistance) free potentials versus a dynamic hydrogen reference electrode (DHE), is measured, and the mass activity, expressed in terms of milliamps per milligram of either total catalyst material, or just the platinum metal present in the electrode, can be calculated at selected potentials and plotted against the IR-free electrode potential. Both the "gas diffusion" and "flooded" types of electrodes can be used to obtain a measurement of the mass activity. An advantage of using the flooded electrodes is that all the catalyst material present on the electrode is wetted with electrolyte and hence is utilised in the activity measurement. This enables a better comparison of the activities of different catalyst materials.

With gas diffusion electrodes, a plot of potential against the logarithm of the mass activity shows a linear region known as the "Tafel region", which is dominated purely by catalytic kinetic effects. The value for the gradient, known as the "Tafel slope", is dependent on the nature of the catalyst and the operating conditions and can be defined as "x". With the flooded electrodes it is common to observe two distinct linear regions in the same plot, one at the lower current densities, with the same value of the slope of "x", and the other at higher current densities, which typically have a value of "2x". This is due to a contribution from the resistance to gas transfer to the active catalyst sites in the flooded electrode. The true mass activity measurement at any given potential with the flooded electrodes can be obtained by extrapolation of the kinetically controlled slope, of gradient "x", to the measurement potential.

The "electrochemical metal area (ECA)" is a measure of the exposed surface area of the platinum metal catalyst on the electrodes, and is expressed in terms of $m^2g^{-1}Pt$. The ECA is determined in accordance with the method described by S. Gilman, J. Electroanal Chem, 7, 382, 1964. This method is based on the use of cyclic voltammetry to deposit and strip off a monolayer coverage of hydrogen on the active catalyst surface at potentials close to hydrogen evolution. The hydrogen adsorption is measured on the fully wetted electrode comprising the electrocatalyst material. The charge associated with hydrogen adsorption is measured and using the relationship 1 $cm^2Pt = 210$ $\mu C$ (C=Coulomb), the electrochemical area of the catalyst is determined.

It can be seen that one way to increase the mass activity of a catalyst material would be to increase the effective surface area of the catalyst (e.g., by reducing the particle size). In this instance this does not necessarily mean that the intrinsic activity of the catalyst surface has changed. The other approach to increasing mass activity is to actually increase the intrinsic activity of the surface. This is known as the "specific activity" and is defined as the oxygen reduction current, as measured above, which is available per unit surface area of the active catalyst metal. It is expressed in terms of $\mu Acm^{-2}$ of catalyst surface, and is obtained by dividing the mass activity by the electrochemical metal area. This is the fundamental measurement of the catalytic activity of different surfaces.

To assess the longer term durability of the catalyst material under more realistic fuel cell operating conditions, an accelerated "durability" test has been developed. It is again advantageous to use the flooded gas diffusion electrodes since effects on performance due to variations in the electrode structure and the degree of electrolyte wetting can be eliminated, and only performance changes due to the stability properties of the catalyst are observed. The durability measurement is made by applying a galvanostatic load (i.e. a fixed current density) to the electrode, with pure oxygen as a reactant, in 100% phosphoric acid at 180° C., and recording the electrode voltage change with time. These operating conditions are more severe than those employed in practical fuel cell operation, and as such this test provides relevant information on catalyst durability over a shorter time period than the actual design lifetime of a fuel cell system.

I. ACTIVITY OF ELECTRODES FOR OXYGEN REDUCTION REACTION

EXAMPLE 1

Platinum Catalyst Derived from Platinum Phthalocyanine

The method of preparation used was a precipitation method as described in GB 2164785A. A platinum phthalocyanine precursor to the catalytic material, having 0.87% by weight of platinum, was prepared by dissolving platinum phthalocyanine (0.068 g) in 18.4M sulphuric acid (25 cm$^3$) at room temperature. The solution was stirred, and graphitised Shawinigan carbon (2.0 g), an acetylene black carbon of BET surface area 55 m$^2$g$^{-1}$, (the ungraphitised Shawinigan is available from Chevron Chemicals, Houston, Tex., USA) was added to form a viscous slurry which was stirred for 15 minutes. Stirring was continued for approximately 30 minutes while water (30 cm$^3$) was added dropwise and the slurry cooled by an ice bath. Cooling was continued for a further hour at room temperature. The slurry was then filtered and washed with water until the pH of the supernatant liquid was pH6. The resultant filtered catalytic material precursor was dried at 105° C.

Hydrophobic gas diffusion electrodes with 30 wt % PTFE were prepared from this macrocyclic catalyst precursor material, using conventional methods as described above. The electrode preparation was completed by heat treatment in air at 350° C. for 15 minutes. The electrode was activated prior to making activity measurements by placing the electrode in the electrochemical half cell, and sweeping an applied potential between 0.05 and 1.20 V versus the DHE reference at least ten times, under conditions of 100% phosphoric acid electrolyte at 180° C., with air passing down the gas side of the electrode sample.

EXAMPLE 2

Iridium Catalyst Derived from Iridium Phthalocyanine

The method described in Example 1 was used to produce a 3.5% iridium phthalocyanine precursor to the catalytic material, having 0.62 wt % Ir. The electrode was activated as described in Example 1 to produce the active catalytic material.

EXAMPLE 3

Platinum Catalyst Derived from Platinum Phthalocyanine

A platinum phthalocyanine precursor to the catalytic material was prepared according to the method of the invention. Platinum phthalocyanine (0.064 g) was dissolved in 14M sulphuric acid (50 cm$^3$). Dried graphitised Shawinigan carbon, (2.0 g) was added to the solution to produce a slurry which was kept at room temperature and stirred for 16 hours. The slurry was filtered and washed with 14M sulphuric acid (50 cm$^3$) and then demineralised water until the supernatant liquid was pH 5.5-6. The method of preparation was an adsorption method, and the catalyst assayed (by Emission Spectroscopy) as 0.64 wt % Pt.

Gas diffusion electrodes were prepared and the activation procedure was carried out as described in Example 1 above.

EXAMPLE 4

Iridium Catalyst Derived from Iridium Phthalocyanine

The method described in Example 3 was used to produce a carbon supported iridium phthalocyanine material, with a loading of 0.22 wt % Ir. The catalyst was activated as described in Example 1.

Examples 1, 2, 3 and 4 were tested as described above for their activity for oxygen reduction with 100% phosphoric acid as the electrolyte at 180° C. The polarisation curves of voltage versus current density in terms of mAmg$^{-1}$ (platinum group metal) obtained are shown in FIG. 1.

Measured values for the mass activity of Examples 1, 2, 3 and 4 with respect to oxygen reduction, versus DHE, and with an electrolyte of 100% phosphoric acid at 180° C. are given in Table 1 below.

TABLE 1

| | | | Mass Activity | |
| --- | --- | --- | --- | --- |
| Example | Catalyst Precursor | Assay (wt % metal) | (mAmg$^{-1}$ precursor, at 850 mV) | (mAmg$^{-1}$ metal, at 900 mV) |
| 1 | Platinum Phthalocyanine | 0.87% Pt | 9.5 | 12.0 |
| 2 | Iridium Phthalocyanine | 0.62% Ir | 11.5 | 16.0 |
| 3 | Platinum Phthalocyanine | 0.64% Pt | 13.0 | 16.0 |
| 4 | Iridium Phthalocyanine | 0.22% Ir | 14.6 | 46.0 |

The results in Table 1 above show that the activity, in terms of mAmg$^{-1}$ of macrocycle catalyst precursor at 850 mV, are superior to the activity of all prior art macrocycle-based catalyst evaluated in acid electrolytes. Furthermore, the catalysts prepared by the method of the invention, Examples 3 and 4, are superior to the catalysts of Examples 1 and 2, prepared by the precipitation method, which is commonly practised in the art.

EXAMPLE 5

Platinum Catalyst Derived from Platinum Phthalocyanine

A further example of the novel catalyst material that is the subject of the invention was produced according to the methods disclosed in this invention. Platinum phthalocyanine (1.234 g) was dissolved in 14M sulphuric acid (1000 cm$^3$). Dried, graphitised Ketjenblack EC300J carbon (4.0 g), (the ungraphitised Ketjenblack is available from Akzo Chemie Nederland bv, Amersfoort, Netherlands) having a BET surface area of 252 m$^2$g$^{-1}$, was added to the solution to produce a slurry which was kept at room temperature and stirred for 16 hours. The slurry was filtered and washed with 14M sulphuric acid (50 cm$^3$) and then demineralised water until the supernatant liquid was pH 5.5–6.0. The material so produced was dried in air at 105° C. The method of preparation was an adsorption method, and the catalyst precursor assayed at 4.7 wt % Pt.

A "flooded" type of electrode was fabricated using the platinum phthalocyanine material, as described above, by using 10% PTFE content in the electrode rather than the higher quantities normally employed in the fabrication of gas diffusion electrodes. In addition, the electrode preparation was completed by sintering in nitrogen at 330° C.

A number of electrodes of the above type were activated in 100% phosphoric acid, at 180° C., by sweeping the potential between 0.05 V and a range of values from 1.05 and 1.35 V (versus DHE) at a rate of 30 mVs-1 for a period of 930 minutes with nitrogen gas flowing past the gas side of the electrode. The measurements of current density and over-voltage were then carried out using oxygen as the reactant gas.

Figure 2:
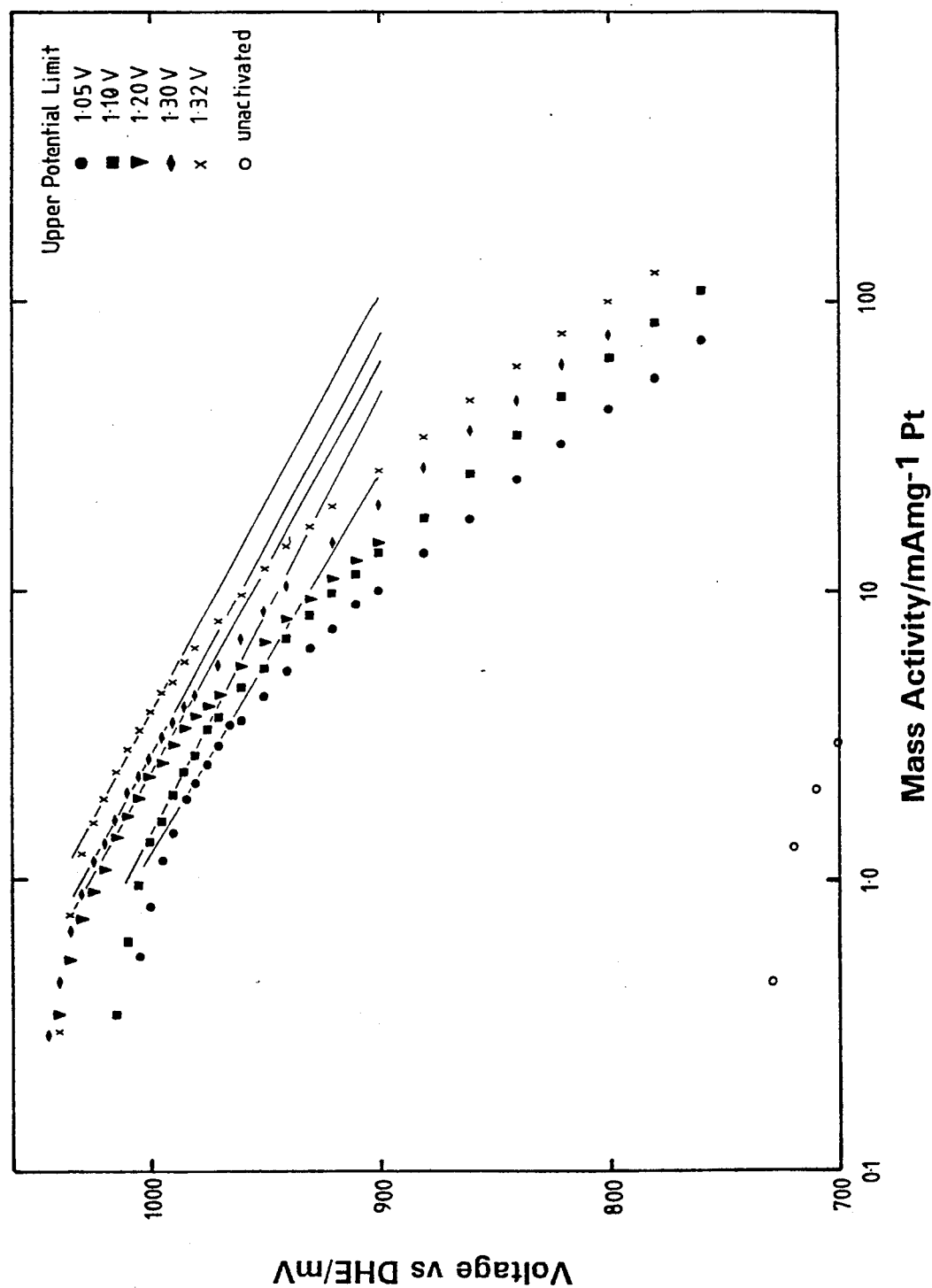

The effect of the differing higher potential limits on the activity displayed by the catalyst material is shown in FIG. 2. It can clearly be seen from the data that sweeping to an increasingly higher positive potential increases the mass activity of the resultant active catalyst material. Also shown in FIG. 2 is the activity of an electrode comprising the precursor material, measured prior to the carrying out of the activation step of cycling the potential between 0.05 V and a high positive potential. This shows that the precursor material, which comprises platinum phthalocyanine, with platinum in the +2 oxidation state, possesses very low activity for oxygen reduction.

EXAMPLE 6

Platinum Catalyst Derived from Platinum Tetraazaannulene

A further example of the novel catalyst material that is the subject of the invention was produced, according to the methods disclosed in this invention, using a tetraazaannulene macrocyclic precursor. [Dibenzo[b-,i]1,4,8,11-tetraazacyclotetradecinato]platinum(II), (PtTADA), (0.06 g) was dissolved in 14M sulphuric acid (150 cm$^3$). Dried graphitised Shawinigan acetylene black carbon (1.0 g), was added to the solution to produce a slurry which was kept at room temperature and stirred for 16 hours. The slurry was filtered and washed with 14M sulphuric acid (50 cm$^3$) and then demineralised water until the supernatant liquid was pH 5.5–6.0. The material so produced was dried in air at 105° C. The method of preparation was an adsorption one, and the catalyst precursor assayed at 2.2 wt % Pt. A gas diffusion electrode was prepared using 30 wt % PTFE followed by sintering in air at 350° C. The electrode was then activated as described above, by sweeping to an upper potential of 1.20 V versus DHE, for 1000 minutes, with a flow of nitrogen down the gas side of the test electrode. Although fabricated as a gas diffusion electrode, the electrochemical measurements indicated that the structure had fully flooded during the activation and as a result demonstrated flooded electrode type behaviour.

COMPARATIVE EXAMPLE A

Platinum Catalyst Prepared by Conventional Method

A conventional platinum catalyst material, as presently used in fuel cells, was prepared by adding Shawinigan acetylene black carbon (450 g) to water (70 liters) at 60° C. over 5 minutes to produce a slurry. Sodium bicarbonate (116.5 g) in water (700 cm$^3$) was added to the slurry which was stirred for 5 minutes before heating to 100° C. for 30 minutes. A solution of platinum (50 g) as chloroplatinic acid in water (2000 cm$^3$) was added to the slurry over 12 minutes. The slurry was boiled for 2 hours, and cooled to 90° C. A 1% formaldehyde solution (1400 cm$^3$) was added, and the slurry boiled for a further 1 hour, after which it was filtered and washed free of soluble chloride ions with water. The platinum catalyst material so-produced was then dried at 105° C. The catalyst had an assay of 9.73 wt % Pt.

COMPARATIVE EXAMPLE B

Platinum/Nickel Alloy Catalyst

A state of the art alloy catalyst comprising platinum and nickel was prepared at 10 wt % Pt loading according to the method described in U.S. Pat. No. 5,068,161. Shawinigan acetylene black (44.1 g) was added to demineralised water (2000 cm$^3$) and stirred for 15 minutes to produce a homogeneous slurry. Sodium bicarbonate (15.49 g) was added to the slurry and stirred for 5 minutes. The temperature of the slurry was raised to 100° C. and maintained at the boil for 30 minutes. A solution of platinum (5.0 g) as chloroplatinic acid, in demineralised water (60 cm$^3$), was added subsurface to the slurry over 5 minutes. The slurry was boiled for 5 minutes. A solution of nickel (0.9 g) as the nitrate salt (Ni(NO$_3$)$_2$.6H$_2$O, 4.46 g), in demineralised water (50 cm$^3$) was added over 10 minutes. The slurry was boiled for a further 2 hours. Formaldehyde solution (3.9 cm$^3$), diluted to 39 cm$^3$ was added over 10 minutes. The slurry was boiled for a further 60 minutes and then filtered to remove supernatant liquid and washed with demineralised water to remove soluble chloride species. The chloride-free filter cake was vacuum dried at 80° C. until the moisture content was less than 2%. The material was then heated to a temperature of 930° C. in a flowing nitrogen atmosphere and maintained at this temperature for 60 minutes to form the alloy. This gave a catalyst of 9.69 wt % Pt, 1.65 wt % Ni and a Pt:Ni atomic ratio of 64:36.

Figure 3:
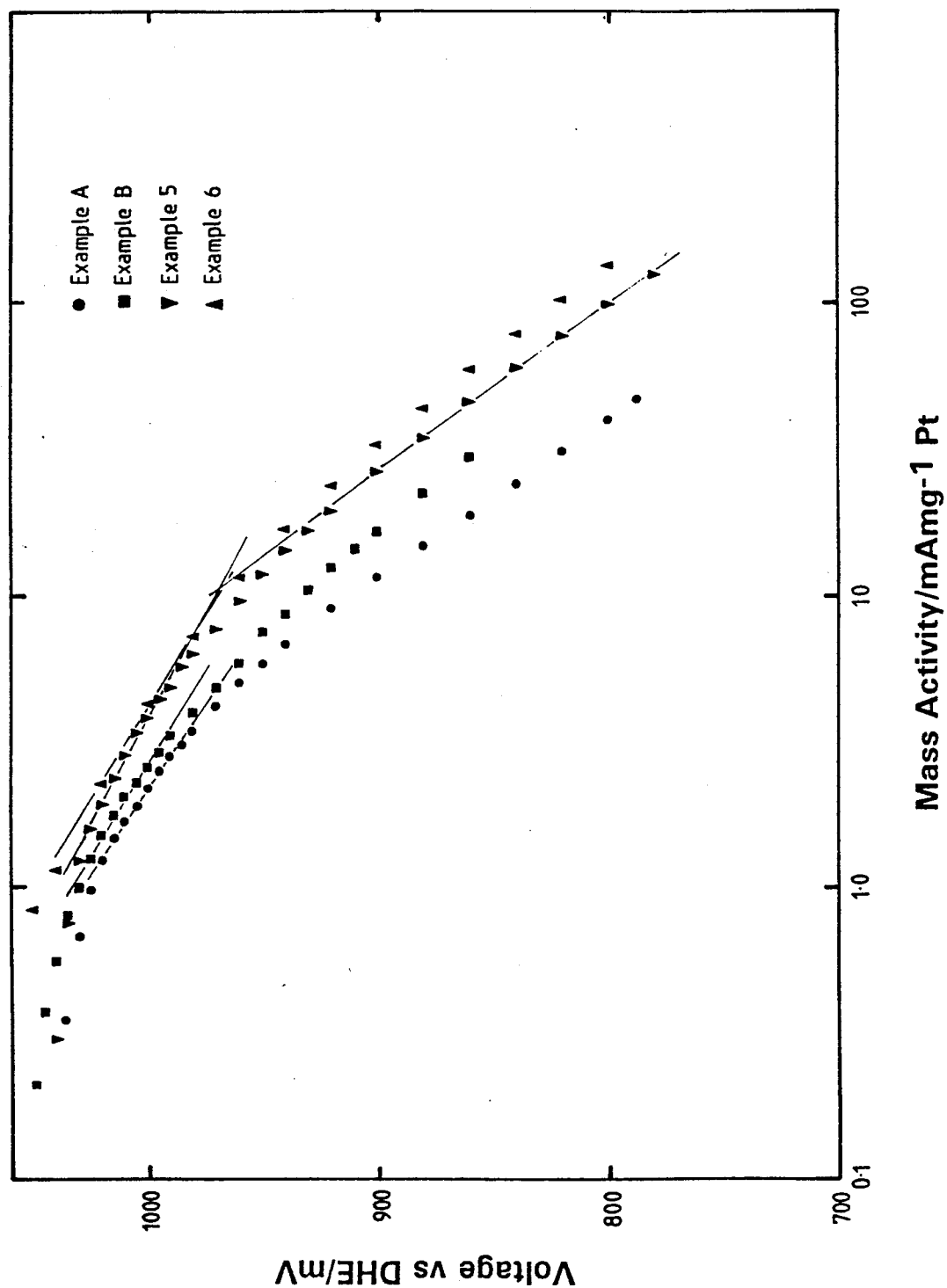

Flooded electrodes of Comparative Examples A and B and Example 5 were fabricated, as described above. Example 5 was activated as described above, sweeping to a potential of 1.32 V versus DHE. The electrodes of Examples 5 and 6 and Comparative Examples A and B were evaluated for oxygen reduction activity in 100% phosphoric acid, at 180° C. Mass activities were calculated using the Pt assays of the electrodes after testing to account for any metal lost during the test. The polarisation curves of voltage versus mass activity obtained are shown in FIG. 3.

As described above, flooded-type electrodes show polarisation curves that have two linear portions when voltage is plotted against the logarithm of the current density (or mass activity). Extrapolation of the lower current linear slopes, to a selected measurement potential of 900 mV, allows direct comparison of different catalyst types in terms of mass or specific activity. The extrapolation results are shown in Table 2.

TABLE 2

| Example | | Mass Activity (mAmg$^{-1}$ Pt at 900 mV) |
|---|---|---|
| Comparative Example A | (Pt) | 33 |
| Comparative Example B | (Pt/Ni) | 53 |
| Example 5 | (PtPc) | 103 |
| Example 6 | (PtTADA) | 75 |

As can be seen from the data in Table 2, extrapolated mass activities for Comparative Examples A and B agree well with those values described above for conventional state of the art carbon supported pure platinum and platinum/base metal alloy catalysts.

The results as shown in FIG. 3 and Table 2, show that the catalyst of the invention are significantly superior in mass activity to conventional state of the art platinum group metal catalysts.

II. DURABILITY OF ELECTRODES TO POTENTIAL LOSS DURING OXYGEN REDUCTION

Comparative Examples A and B and Example 5 fabricated into flooded-type electrodes were tested for durability with oxygen as the reactant in 100% phosphoric acid at 180° C. under galvanostatic (constant current density, i.e. load) control for 6 hours. The electrode of Example 5 was activated in 100% phosphoric acid, at 180° C., by sweeping the potential between 0.05 and 1.05 V (versus DHE) at a rate of 30 mVs$^{-1}$ for a period of 930 minutes with nitrogen gas flowing past the gas side of the electrode. In each case, in the galvanostatic test, the load was set to achieve an initial potential of 850–800 mV vs DHE. It is known that catalyst de-activation is very highly dependent on applied operating potential, and current density has a comparatively smaller effect.

After 6 hours at a load of 50 mAcm$^{-2}$, Comparative Example A experienced a drop in potential of 130 mV, whereas, under a similar load, Comparative Example B experienced a drop in potential of 105 mV. Example 5, under load of 3.7 mAcm$^{-2}$ experienced a potential drop of only 20 mV during the 6 hour period.

Figure 4:
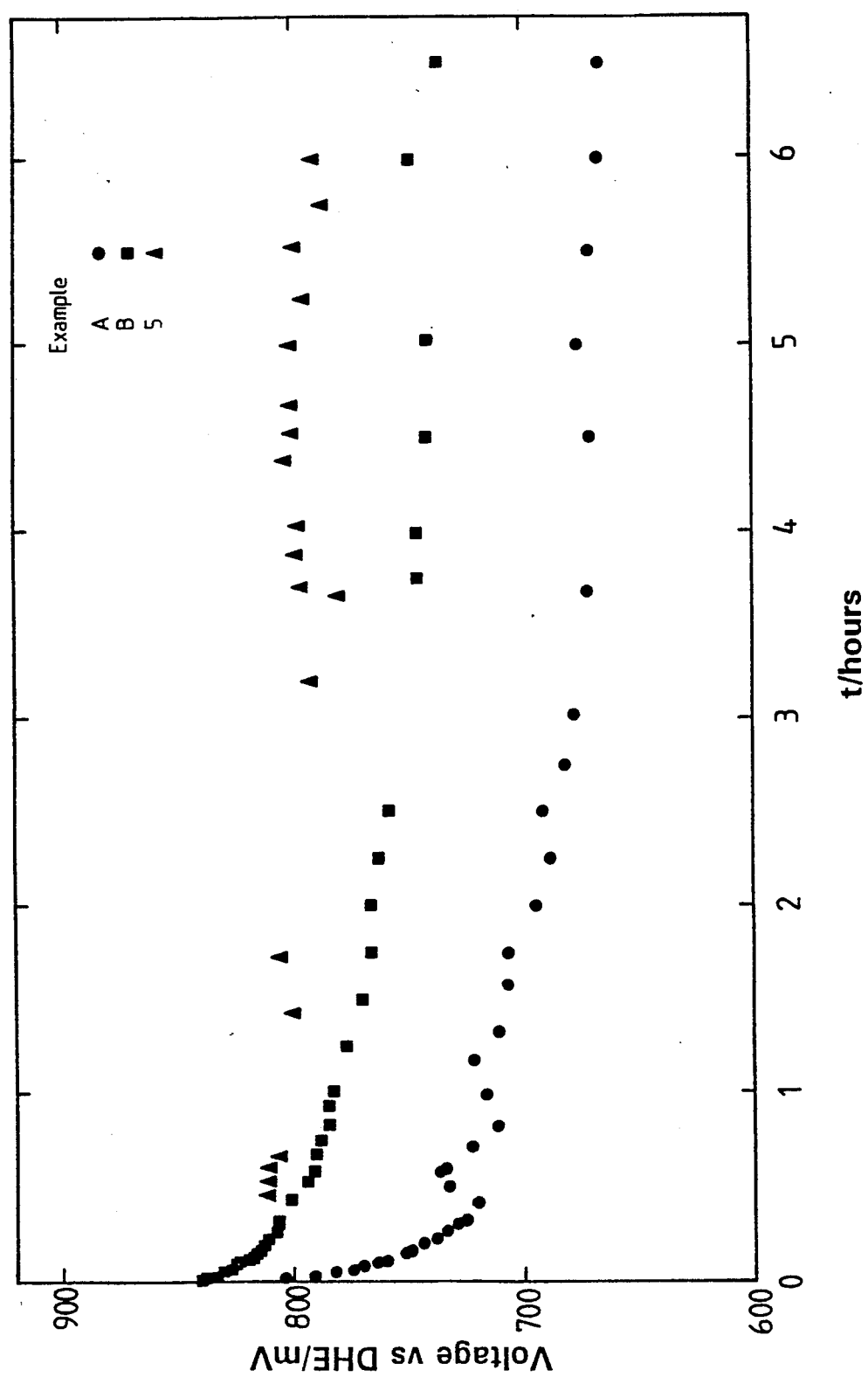

The results are shown in FIG. 4. This data clearly demonstrates that the catalyst materials of the invention possess far greater resistance to catalyst de-activation when compared to the currently used catalyst materials.

III. NATURE OF THE ELECTROCATALYTIC MATERIAL

The physical nature of the active material of Example 5 was investigated using X-ray Photoelectron Spectroscopy (XPS) and cyclic voltammetry, both of which are commonly used by workers in this field to characterise the surfaces of catalytic materials.

Figure 5:
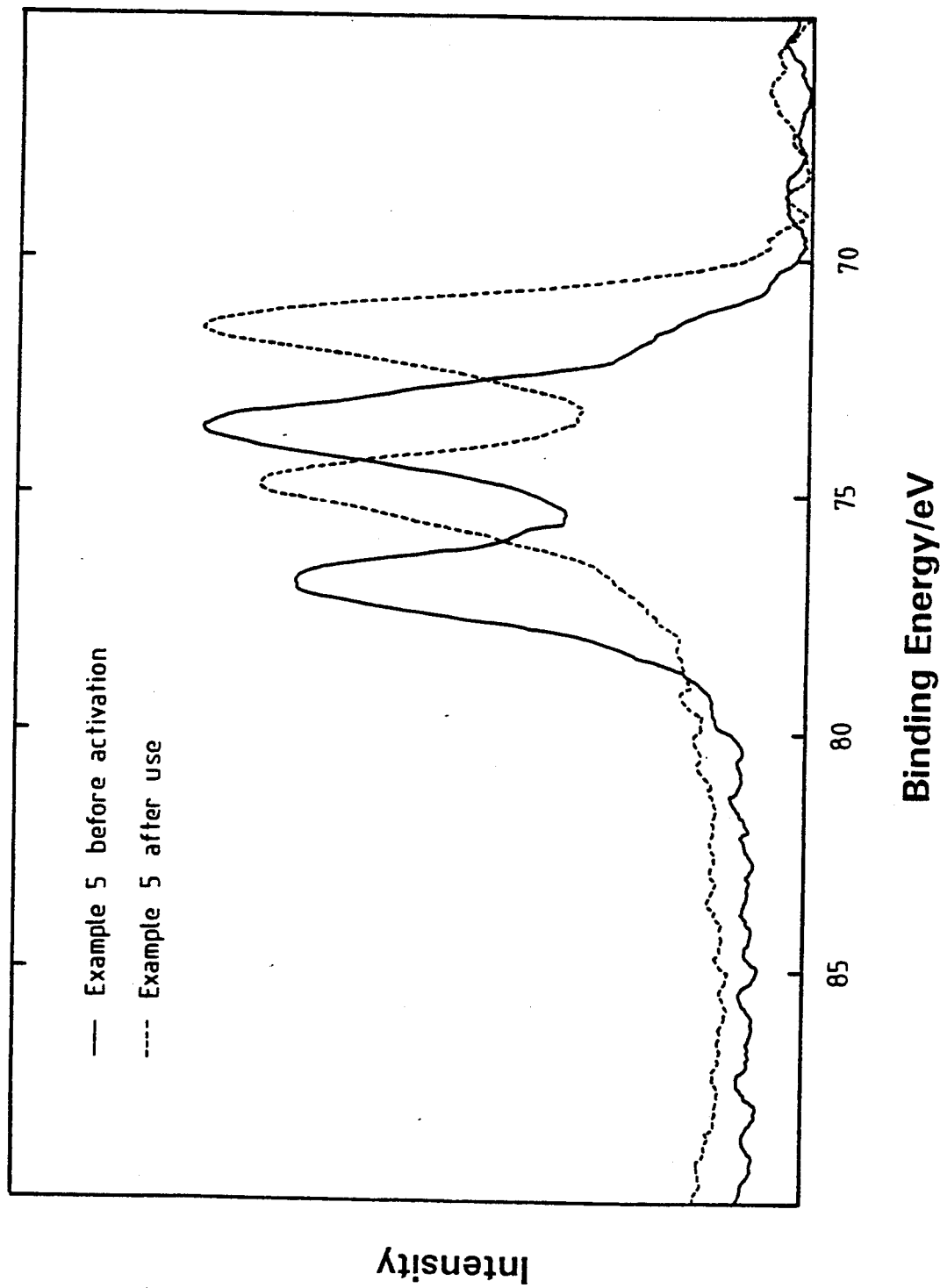

The XPS of Example 5 as the macrocyclic precursor to the active catalyst and as a tested electrode after activation to produce the active catalyst of this invention showed the change in the oxidation state of platinum (Table 3 and FIG. 5).

TABLE 3

| Sample | Pt4f$_{7/2}$Binding Energy |
|---|---|
| Platinum phthalocyanine macrocyclic precursor | 73.6 |

TABLE 3-continued

| Sample | Pt4f$_{7/2}$Binding Energy |
|---|---|
| Electrode of "activated" Pt catalyst | 71.5 |

The shift in the platinum binding energy from 73.6 to 71.5 eV on use as an oxygen reduction catalyst represents a change in platinum oxidation state from (+2) to (0). This shows that the active catalytic material in Example 5 has platinum in the (0) oxidation state.

Figure 6:
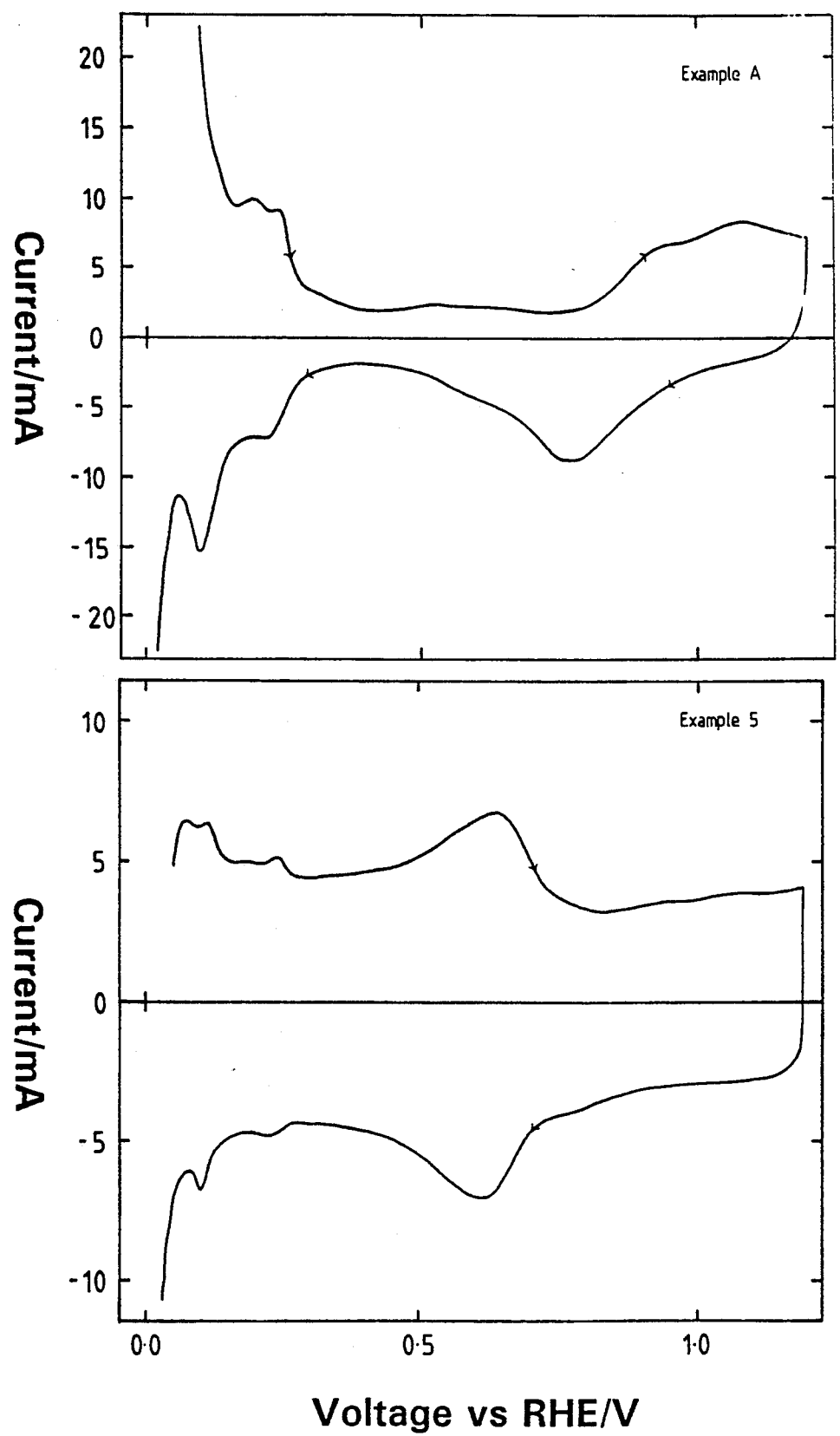

Cyclic voltammetry is a technique used with conventional platinum catalysts to determine active catalyst metal areas. The ECA measurement, as described above, gives an indication of exposed surface area of platinum metal in the (0) oxidation state. The cyclic voltammogram of platinum (0) has a unique and characteristic signal in the potential range 0–0.3 V (versus DHE) which is ascribed to the formation of a monolayer coverage of adsorbed hydrogen on the platinum (0) surface. The amount of hydrogen adsorbed can be measured and is directly related to the platinum (0) surface area. FIG. 6 shows the cyclic voltammetry of Comparative Example A and Example 5 after use as oxygen reduction catalysts respectively. Table 4 shows the ECA calculated from each voltammogram.

TABLE 4

| Example | ECA (m$^2$g$^{-1}$ Pt) | Specific Activity ($\mu$Acm$^{-2}$ Pt) |
|---|---|---|
| Comparative Example A | 50 | 58 |
| Example 5 | 17 | 604 |

It is clear from these voltammograms that although the catalyst material of the invention comprises platinum in the (0) oxidation state, it does not adsorb hydrogen in the same manner as conventional platinum (0) catalysts. The cyclic voltammetry shows that the catalyst of Example 5 adsorbs much less hydrogen compared to Comparative Example A. However, as shown above, the mass activity demonstrated by the catalyst of Example 5 is the superior.

When the mass activity values from Table 2 and the ECA data are used to determine the specific activity of the surfaces, the values as shown in Table 4 are obtained.

Conventional carbon-supported platinum catalyst have specific activities in the range 30–60 $\mu$Acm$^{-2}$, as is commonly reported in the prior art, (see for example, L. J. Bregoli in Electrochim Acta, 23, 489 (1978)). Comparative Example A shows a specific activity which lies in this range. However, Example 5 demonstrates a much higher specific activity than has previously reported for any platinum or platinum-based catalyst system. Indeed, by varying the positive potential of the activation sweep between 1.05 and 1.35 V (versus DHE), specific activities in the range of 200–600 $\mu$Acm$^{-2}$ have been measured.

Whatever the explanation for these unexpected results, the materials of the invention are a form of platinum in the zero oxidation state, which show significantly different properties from platinum (0) prepared by conventional methods, as demonstrated above, and which in particular can be characterised by their greater mass activity and enhanced stability under fuel cell operating conditions, compared to state of the art materials, which will lead to benefits of higher output performance and longer operational life.

We claim:

1. A catalyst material comprising the product obtained by activating a precious metal-containing macrocyclic compound supported on a high surface area carbon so that the precious metal is in the zero oxidation state, said macrocyclic compound being an N4-chelate macrocycle.

2. A catalyst material according to claim 1 wherein the precious metal is selected from the group consisting of platinum, palladium, ruthenium, osmium, rhodium, iridium, silver and gold.

3. A catalyst material according to claim 2 wherein the precious metal is platinum or iridium.

4. A catalyst material according to claim 1 wherein the macrocycle is a phthalocyanine or tetraazaannulene.

5. A catalyst material according to claim 1 wherein the high surface area carbon is a conductive graphitised carbon.

6. A catalyst material according to claim 5 wherein the carbon has a BET surface area of 0–2000 $m^2g^{-1}$.

7. A catalyst material according to claim 6 wherein the carbon has a BET surface area of 30–400 $m^2g^{-1}$.

8. A catalyst material according to claim 1 wherein the loading of the precious metal is 0.05 to 20 wt % of the carbon support.

9. A catalyst material according to claim 10 wherein the loading of the precious metal is 0.1 to 10 wt % of the carbon support.

10. A method for the preparation of a catalyst material according to claim 1, comprising dissolving a precious metal macrocyclic compound in aqueous or organic solvent to form a solution, adding conductive carbon to the solution, absorbing the macrocyclic material onto the carbon support, and separating the carbon-supported macrocyclic material.

11. A method according to claim 10 wherein the solution is agitated for 1–16 hours after addition of the carbon.

12. A method for the activation of a catalyst material according to claim 1, which activation effects a change in the oxidation state of the metal, comprising repeatedly sweeping an applied potential to an electrode carrying the carbon-supported macrocyclic compound precursor which is immersed in an acid electrolyte.

13. A method according to claim 12 wherein the applied potential is 0.05–2.0 V.

* * * * *